US009020052B2

(12) United States Patent
Zhang (10) Patent No.: US 9,020,052 B2
(45) Date of Patent: Apr. 28, 2015

(54) MIMO COMMUNICATION METHOD AND DEVICES (75) Inventor: Haibin Zhang, The Haag (NL)

(73) Assignee: Nederlandse Organisatie Voor Toegepast-Natuurwetenschappelijke Onderzoek TNO (NL)

( * ) Notice: Subject to any disclaimer, the term of this patent is extended or adjusted under 35 U.S.C. 154(b) by 595 days.

(21) Appl. No.: 13/256,342

(22) PCT Filed: Mar. 15, 2010

(86) PCT No.: PCT/NL2010/050134
§ 371 (c)(1),
(2), (4) Date: Nov. 23, 2011

(87) PCT Pub. No.: WO2010/104395
PCT Pub. Date: Sep. 16, 2010

(65) Prior Publication Data
US 2012/0076216 A1 Mar. 29, 2012

(30) Foreign Application Priority Data
Mar. 13, 2009 (EP) .................................. 09155171

(51) Int. Cl.
H04L 27/00 (2006.01)
H04L 1/00 (2006.01)
(52) U.S. Cl.
CPC ............ *H04L 1/0045* (2013.01); *H04L 1/0071* (2013.01)
(58) Field of Classification Search
CPC ..... H04L 1/0071; H04L 1/0065; H04L 1/005; H04L 1/0057; H04M 13/2957
See application file for complete search history.

(56) References Cited

U.S. PATENT DOCUMENTS 7,154,936 B2   12/2006  Bjerke et al.
7,237,180 B1    6/2007  Shao et al.
(Continued)

FOREIGN PATENT DOCUMENTS

WO   02/062002 A1    8/2002
WO   03/049397 A2    6/2003
(Continued)

OTHER PUBLICATIONS

S. Shin, and P. Sweeney, titled "Soft decision decoding of Reed-Solomon codes using trellis methods", published in IEE Proc. Communications, vol. 14, No. 5, pp. 303-308, Oct. 1994.*
(Continued)

*Primary Examiner* — Chieh M Fan
*Assistant Examiner* — Ross Varndell
(74) *Attorney, Agent, or Firm* — Banner & Witcoff, Ltd.

(57) ABSTRACT

A stream of information is communicated by means of transmission distributed over a plurality of transmission antennas and reception distributed over a plurality of reception antennas. In the method the stream is encoded according to an error correcting code, into a series of multi-bit symbols. A sequence of the multi-bit symbols is interleaved, by which symbols are assigned to time slots, so that the multiple bits of the symbols remain together in the same time slot. The interleaved multi-bit symbols are transmitted, with each symbol distributed over the transmission antennas in a respective time slot. Signals received at the reception antennas in each respective time slot are received and demodulated, to produce demodulation results each for a respective time slot. A timeslot sequence of the demodulation results is deinterleaved. Decoded symbol values are selected under a constraint that a series of the selected symbols belongs to the error correcting code. The selection is performed based on information about the probability of the symbol values, obtained as a function of the demodulation results. A function is used that accounts for correlation effects between the signals from combinations of the reception antennas in a time slot.

18 Claims, 2 Drawing Sheets

(56) References Cited

U.S. PATENT DOCUMENTS

| | | |
|---|---|---|
| 7,245,666 B1 | 7/2007 | Gardner et al. |
| 2006/0135081 A1* | 6/2006 | Mysore et al. .................. 455/70 |
| 2006/0159195 A1 | 7/2006 | Ionescu et al. |
| 2008/0112498 A1* | 5/2008 | van Nee et al. ............... 375/262 |
| 2011/0131464 A1* | 6/2011 | Ko et al. ........................ 714/752 |
| 2012/0134423 A1* | 5/2012 | Zhou et al. ............... 375/240.24 |

FOREIGN PATENT DOCUMENTS

| | | |
|---|---|---|
| WO | 2004/071001 A1 | 8/2004 |
| WO | 2007/120733 A2 | 10/2007 |
| WO | 2008/058109 A2 | 5/2008 |

OTHER PUBLICATIONS

International Search Report relating to corresponding PCT/NL2010/050134.

Jiang, Jing, et al.,"Iterative Soft Decoding of Reed Solomon Codes," Communications Letters, IEEE, Apr. 2004, pp. 244-246, vol. 8 , No. 4.

Witzke, Melanie, et al.,"Iterative Detection of MIMO Signals with Linear Detectors," Signals, Systems and Computers, Conference Record of the Thirty-Sixth Asilomar Conference, Nov. 2002, pp. 289-293, vol. 1.

Wolf, Jack,"Efficient Maximum Likelihood Decoding of Linear Block Codes Using a Trellis," IEEE Transaction on Information Theory, Jan. 1978, pp. 76-80, vol. IT-24, No. 1.

\* cited by examiner

MIMO COMMUNICATION METHOD AND DEVICES

RELATED APPLICATION DATA

This application is a National Stage Application under 35 U.S.C. 371 of co-pending PCT application number PCT/NL2010/050134 designating the United States and filed Mar. 15, 2010; which claims the benefit of EP patent application number 09155171.3 and filed Mar. 13, 2009 each of which are hereby incorporated by reference in their entireties.

FIELD

The invention relates to a method and devices for MIMO (Multiple Input Multiple Output) communication of a stream of data distributed over a plurality of parallel reception antennas.

BACKGROUND

EP 1451991 describes MIMO (Multiple Input Multiple Output) transmission and reception. MIMO transmission involves transmission of a data stream distributed over a plurality of parallel transmitters. This serves to increase transmission capacity compared to transmission from a single transmitter. The transmissions of the transmitters are received by a plurality of receivers and the received signals are used to reconstruct the data stream.

In a MIMO system, reconstruction involves correction for interference between transmissions from different transmitters. Reconstruction is made possible by encoding the data stream before transmission, using an error correcting code (ECC) and interleaving. The ECC adds redundancy that ensures that errors can't change a code symbol for one data input into a valid code symbol for another data input, unless more than a threshold number of errors occurs in the code symbol. Interleaving ensures that different bits from the same code symbol are not located close to each other, so that it is avoided that they can be collectively affected by a short burst of errors.

After reception, the information from the receivers is de-interleaved and used to determine the most likely code words in view of the received information from the combination of receivers. EP 1451991 describes a MIMO system wherein an iterative process is used to determine the most likely code words. This involves determining the likelihood of possible transmitted code bits from the received information and a priori probabilities of the code bits. The a priori probabilities are determined iteratively by a bit-based ECC decoder.

EP 1451991 uses an iterative loop for this purpose. At the input of the loop the receivers supply numbers, each for a respective one of the bits, to represent the likelihood that the bit is set. Numbers representing corrected likelihoods for the bits are obtained by subtracting a priori likelihoods for the bits, obtained from feedback in the iterative loop. A decoder uses the combination of likelihoods for the bits of code symbols to produce the a priori likelihoods for use in the feedback. A de-interleaver is used in front of the decoder to reorder the corrected numbers in order to re-assemble the likelihoods for the different bits of a code symbol. Behind the decoder an interleaver is used, to interleave the priori likelihoods from the decoder back to the order of the bits at the input of the iterative loop.

This approach does not make optimal use of all information about reception conditions. The de-interleaving separates information about different bits that are received in the same time slot, before supplying the information to the decoder. As a result the bit-based ECC decoder generates bit information with optimally improved reliability only if the bits and their respective information are independent among each other. However, this assumption of independency is not always true. An example of situations where dependency among bits in the same codeword exists is slow fading. Another example is in a MIMO system where the signals transmitted by different transmission antennas interfere with each other, due to the cross-correlation among MIMO channels. In such situations, information about correlations between such bits, e.g. the joint probabilities of these bits and/or between the errors that occur in such bits may be exploited to reduce the symbol error rate. However, it is difficult for the prior art bit-based decoder to use such correlation information.

Many prior art documents describe the use of bit level interleaving between detection of received data in terms of probabilities and decoding by means of an error correcting code. This means that relations between bits received in the same time slot are obscured for decoding according to the error correcting code. This is the case for example in WO02/062002, US2008/058109 and WO03/049397, which all describe MIMO systems that use an error correcting code and bit level interleaving before error correction using the error correcting code.

U.S. Pat. No. 7,245,666 concerns MIMO coding using soft symbol decoding phase, wherein received data is compared to possible combinations of transmitted symbols, to generate a soft probability metric for each of the transmitted bits. The space of possible combinations of transmitted symbols with which the received data is compared is reduced by limiting the number of bit combinations for individual antennas. The soft metrics for the transmitted bits is used as input for a Viterbi decoder that performs hard symbol decoding.

Although U.S. Pat. No. 7,245,666 uses soft metrics for individual bits as input for hard symbol decoding, it first computes joint metrics for multi-bit symbols. These are reduced to a metric for an individual bit at an individual antenna, by taking the minimum value of the joint metric over bit combinations wherein the bit has the same value. The metrics for the individual bits are supplied to the Viterbi decoder. Thus, information about joint detection probability is suppressed before hard decoding.

WO2004/071001) also concerns MIMO decoding of received symbols. An example is given how the demodulation output is converted into probability values for individual bit symbols, eliminating joint probabilities. Joint probability effects such as inter symbol interference are eliminated at an earlier stage, by means of a space matched filter. A Reed Solomon decoder may be used, but the code symbols of the Reed Solomon code appear to be unrelated to individual time slots.

SUMMARY

Among others it is an object to provide for MIMO transmission and reception that makes it easier to use information about joint probabilities of bits that are received in the same time slot.

A method according to claim 1 is provided. Herein an ECC encoded and interleaved stream of data is transmitted and received via a plurality of parallel antennas. Signals received at the reception antennas in each respective time slot are used to determine an indication of symbol level probabilities. The probabilities that respective different possible multi-bit symbol values have been transmitted in the respective time slot are indicated. The indications represent correlation between bits in the multi-bit symbol, that is they are not merely a product of probabilities for individual bits. Correlation may be represented for example by providing $2^n$ joint probabilities for n bits in an n-bit symbol instead of n probabilities, each for an individual bit.

In an embodiment a multi-bit symbol arithmetic based code is used. In this embodiment encoding comprises applying the multi-bit symbol arithmetic to input bits taken from the stream to produce the multi-bit symbols of the encoded stream. Subsequently interleaving comprises assigning multi-bit symbols from the encoded stream to respective ones of the time-slots in a time slot sequence, changing distances between the symbols in the time slot sequence compared to distances between the symbols in the encoded stream. This makes it possible to compute corrections of the symbols more efficiently. A Reed Solomon code may be used for example.

BRIEF DESCRIPTION OF THE DRAWINGS

These and other objects and advantageous aspects will become apparent from a description of exemplary embodiments, using the following figures.

DETAILED DESCRIPTION OF EXEMPLARY EMBODIMENTS

Figure 1A:
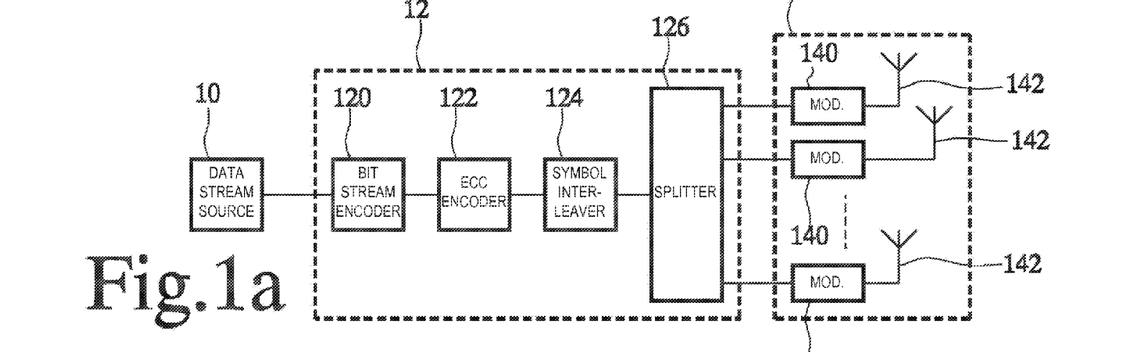
FIG. 1a,b shows a MIMO transmitter and receiver
Figure 1B:
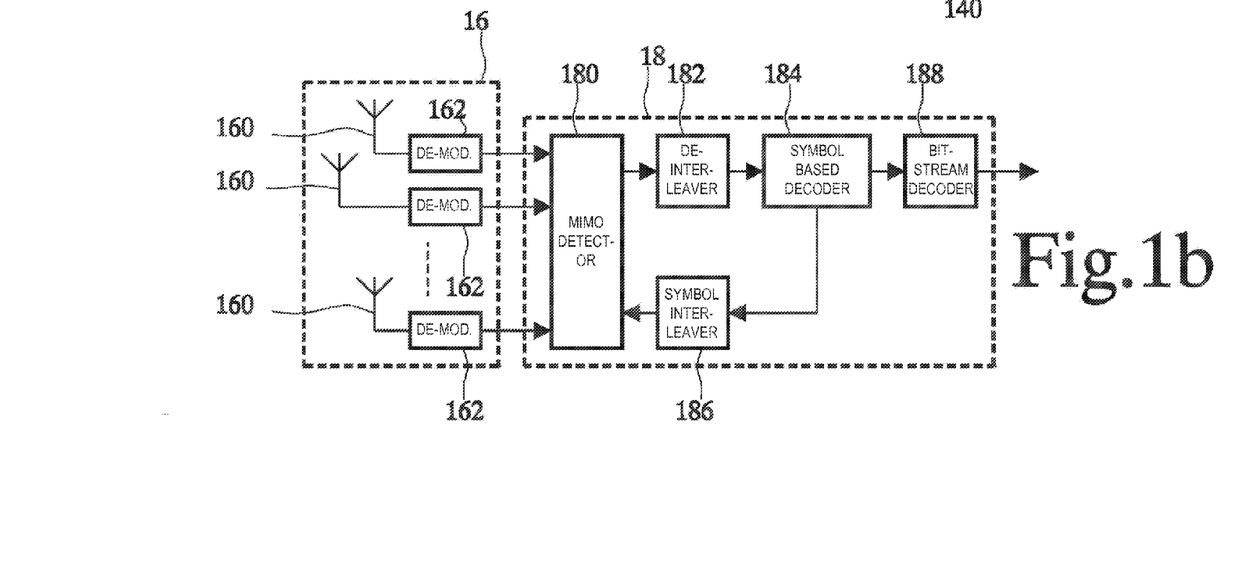
Figure 2:
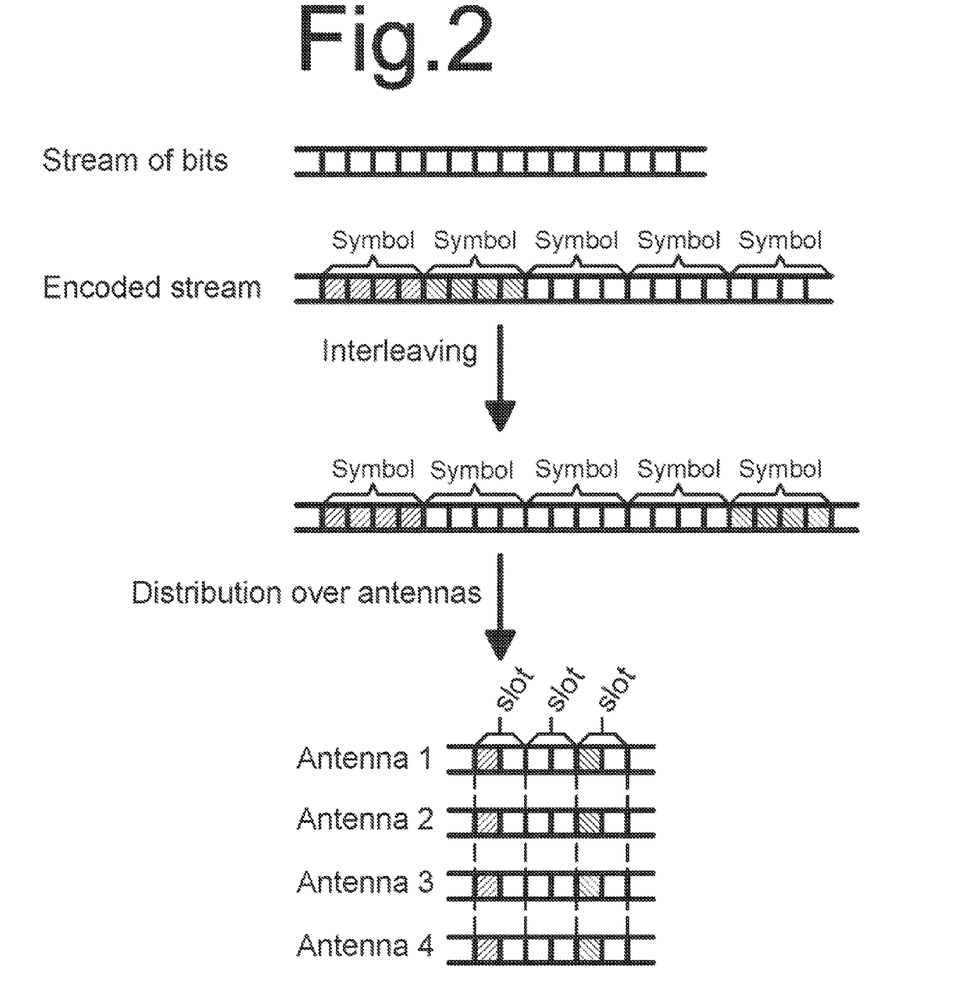
FIG. 2 shows changing distances between symbols.

FIG. 1a shows a MIMO transmitter comprising a data stream source 10, a MIMO encoder 12 and a transmitter arrangement 14. FIG. 1b shows a MIMO receiver comprising a receiver arrangement 16 and a MIMO decoder 18.

MIMO encoder 12 comprises an optional bit-stream encoder 120, an ECC encoder 122, a multi-bit symbol interleaver 124, and a splitter 126. Bit-stream encoder 120, ECC encoder 122 and symbol interleaver 124 are coupled successively in series between data stream source 10 and splitter 126.

Transmitter arrangement 14 comprises a plurality of units, each unit comprising a modulator 140 and an antenna 142. Each modulator 140 has an input coupled to a respective output of splitter 126 and an output coupled to a respective antenna 142.

Receiver arrangement 16 likewise comprises a plurality of units, each with an antenna 160 and a demodulator 162. Preferably, the number of units in receiver arrangement 16 is at least equal to the number of units in transmitter arrangement 14.

MIMO decoder 18 comprises a MIMO detector 180, a symbol de-interleaver 182 and a symbol based decoder 184. MIMO detector 180 has inputs coupled to antennas 160 via respective demodulators 162. MIMO detector 180 has an output coupled to symbol based decoder 184 via symbol based de-interleaver 182. In an embodiment MIMO detector 180 may comprise a plurality of parallel detector units, which contribute respective parts of the output signal. Optionally, a symbol interleaver 186 and an optional bit-stream decoder 188 may be added, symbol interleaver 186 feeding back decoding results to MIMO detector 180.

In an embodiment symbol based decoder 184 may comprise a plurality of parallel decoder units, which contribute respective parts of the output signal in parallel. Optionally an output of symbol based decoder 184 is coupled to bit-stream decoder 188. In an embodiment, bit-stream decoder 188 may be omitted, or replaced by another post-processing circuit (e.g. a demapper that de-maps to bits), that executes an additional procedure of symbol-to-bit information conversion. Similarly, bit-stream encoder 120 may be omitted or replaced by a pre-processing circuit.

In operation modulators 140 generate modulated transmission signals, such as RF signals or optical signals, to carry data produced by splitter 126. Modulation techniques such as QAM modulation may be used, wherein the phase and/or amplitude of the signal in a time slot represent a plurality of bits. Antennas 142 transmit the modulated signal. Modulators 140 operate on the basis of a succession of common time slots. In a time slot, modulators 140 make antennas 142 transmit transmission signals carrying bits of a respective multi-bit symbol (with p bits where p=NT*Q>1, where NT is the number of transmission antennas, and Q is the number of bits in one modulation symbol; p may be 4 for example and in this case two modulators 140 and two antennas 142 may be used (i.e. NT=2), modulator setting a phase and/or amplitude to provide for transmission of two bits (i.e. Q=2)). In different time slots, modulators 140 make antennas transmit bits of different symbols. The symbols are produced by MIMO encoder 12.

ECC encoder 122 may encode a stream of bits from data source 10 according to an Error Correcting Code (ECC). A q-bit symbol based ECC may be used (q>1), or a bit based ECC. In an embodiment ECC encoder 122 is configured to take blocks of k*q bits (k>=1 and preferably k>1) from a stream of bits from bit-stream encoder 120 (or data source 10) and to encode each block as an encoded block with a plurality of q-bit symbols of an Error Correcting Code (ECC). Instead of a block based code, a convolutional code or a turbo code may be used. In an embodiment using a systematic code, encoding comprises adding q-bit redundant symbols, increasing the information rate. In the case of a block based code this results in a codeword with n q-bit symbols (n>k). In the case of multi-bit symbol encoding, encoder 122 may be configured to split the stream into a plurality of q-bit groups and to compute the redundant symbols as an algebraic function of multi-bit numbers, each represented by a q-bit group. In the case of a non-systematic code, all encoded symbols may be computed using such functions.

A Reed Solomon code may be used for example. A Reed Solomon treats the q-bit groups as representations of numbers from a Galois field and uses arithmetic computations over the Galois field to compute the redundant symbols. More generally, any ECC code can be used for encoder 122. In the case of block based coding it is preferred that the ECC code length N is a multiple of a number p (p>1), of bits that will be transmitted by different antennas 142 in the same time slot. In an embodiment p=q. For a q-bit ECC code, N may equal n*q.

The interleaver 124 of the MIMO transmitter rearranges the sequence of the symbols, keeping the p-bits together. Interleavers are known per se. In an embodiment an interleaver may comprise a memory and an address generator. In operation symbols are written at different locations and read in a different sequence compared to the sequence of writing, according to address sequences that are controlled by the address generator. In an embodiment wherein a block based ECC is used, with ECC codewords consisting of a block of symbols, interleaver 124 preferably changes the distance between symbols to such an extent that the number of time slots between time slots with symbols from the same ECC codeword exceeds the number of symbols in the ECC block for the majority of symbols from each block.

Splitter 126 distributes the p-bits of each symbol over modulators 140. In the case of q-bit symbol based ECC coding, where q=p, each symbol produced by multi-bit symbol encoder 122 will be transmitted in a respective one of the common time slots, with the bits of the symbol distributed over different modulators 140 and antennas 142.

The antennas 160 of the MIMO receiver receive different RF signals from the MIMO transmitter. Each antenna 160 receives a signal that is depends on a combination of signals from all the antennas 142 of the MIMO transmitter, convoluted, or at least weighted, by the channel impulse responses between the respective transmission antennas 142 and the reception antenna 160. There are totally NT*NR channels between NT transmission antennas 142 and NR reception antennas 160, with NR>=NT.

In an ideal case the NT*NR channels would independent among each other and noise free. In this ideal case, the output of demodulators 162 could simply determine the transmitted symbol (and thus also the corresponding bits). Effectively, in terms of probabilities, this would mean that one symbol has a likelihood corresponding to certainty and the other symbol values have no likelihood at all. However, in practice the interference between symbols transmitted by different antennas, as well as the errors in channel/time/frequency estimation, make such an absolutely certain determination impossible.

Demodulators 162 generate a baseband received signal, which is input to MIMO decoder 18 for further processing. Demodulation may involve reception algorithms such as channel estimation and time/frequency offset estimation. Demodulators 162 may produce digitized representations of real and imaginary parts of a measured modulation vector for example, or a digitized representation of a single modulation parameter value. In an embodiment, the demodulated signal may have a higher resolution than would be minimally sufficient for decoded bit values in the ideal case without interference and noise. Thus for example, when QPSK modulation is used, where one bit quantization of the real and imaginary parts would suffice for decoding in the ideal case, a finer quantization of each of the real and imaginary parts may be used, for example a three bit representation.

MIMO detector 180 computes indications of the likelihood of different possible (multi-bit) symbol values in a time slot, conditioned on the received signal output from demodulators 162. When p-bit symbols are used, at most $2^p$ multi-bit symbols are possible here. When p=4 for example, sixteen symbol values may be possible. When a plurality of bits is modulated using the phase and/or amplitude of a carrier signal in a time slot, MIMO detector 180 may indicate joint probabilities of these bits, i.e. probabilities of different combinations of multiple bits in the same time slot. The MIMO detector 180 computes the probabilities based at least on the received signals from demodulators 162 and the known (estimated) channel impulse responses. In an embodiment that will be described later, MIMO detector 180 computes and outputs indications of conditional probabilities of corrected symbol values, also based on feedback from symbol-based decoder 184.

De-interleaver 182 re-arranges the sequence of these indications for different time slots, keeping the indications for symbol values within the same time slot together. Thus, when p=4 for example indications for sixteen possible values of a symbol are kept together, but the sequence of indications for different symbols is changed.

Symbol based decoder 184 uses the de-interleaved output of the MIMO detector 180 as the input. Symbol based decoder 184 determines decoded data effectively based on probability values for combinations of possible decoded symbol values, taking account of the combination of symbol values that are possible in encoded data E produced by the ECC. Formally, the operation of MIMO detector 180 and symbol based decoder 184 corresponds to implicit or explicit use of an expression for Pr(E|[Y]), the probability that encoded data E from the ECC has been transmitted given a series [Y] of successive demodulation results. Herein the encoded data E is limited to data sequences allowed by the ECC, as a result of corresponding input data.

Bayesian relations can be used to compute this probability Pr(E|[Y]) from the conditional probability Pr([Y]|E) that a series [Y] of demodulation results produced when ECC encoded data E is transmitted. In an embodiment an approximated conditional probability Pr([Y]|E) may be used that corresponds to a product of conditional probabilities Pr(Y(i)|S(i)) of a demodulation result Y(i) in a respective timeslot (labeled by the index "i"), when the encoder was in a state S(i) in that time slot, the state S(i) being the result of processing the input data. In a further embodiment an approximated conditional probability Pr([Y]|E) may be used that corresponds to a product of conditional probabilities Pr(Y(i,j)|S(i)) for demodulation results Y(i,j) from respective antennas (labeled j) in respective timeslots (labeled j) for symbols S(i) from encoded data E transmitted in those time slots.

Such approximations for Pr(Y|E) account for correlations in the joint probability of errors in different bits of a received symbol at an antenna, or a combination of antenna's, in the same time-slot. MIMO detector 180 determines an indication of the probability for various possible encoded signals. As an example how joint probabilities may arise, the combined values of bits from a group of bits may be modulated as a phase-amplitude points. In this case, different mutually isolated phase-amplitude points correspond to modulation of different combinations of values for these bits. At reception deviations from these ideal points occur. In this case, a demodulated signal Y(i) may represent a measured phase-amplitude point that need not coincide with any of the isolated phase amplitude points. Such a measured phase amplitude point may be represented for example in terms of real and imaginary parts, with a resolution higher than minimally necessary merely to distinguish different isolated modulation points (for example, in a case with sixteen isolated phase amplitude points arranged in a four by four grid are used, two bits for a real part and two bit for an imaginary part are minimally necessary to distinguish the isolated points, and the modulation result Y may use three or more bits for each of the real and imaginary parts). In the case of OFDM modulation, correlations between reception of bits modulated at different frequencies may be accounted for. Because de-interleaver 182 keeps this information from the demodulated signal together, symbol based decoder 184 is able to make use of correlations within groups bits.

Information representing the conditional probabilities Pr([Y]|E) and hence Pr(E|[Y]) may be determined before reception, given the channel response functions and possible distorting effects such as fading. These may result in values for the probabilities Pr(Y(i)|S(i)), or values of parameters in an expression for the probabilities. A table of such values may be stored for example. In one example such a table may have $2^{p*NR*Ns}$ entries, where p is the number of bits used to represent the demodulation result per reception antenna, NR is the number of reception antenna's and Ns is the number of possible symbol values per time slot. In this table each entry contains a probability value for a combination of modulation signal values for the different reception antenna's and a symbol value. Such a table allows for representation of correlations between the effects of different antenna's, because it need not use a product of probabilities of different antenna's (in that case a table with $2^{p*Ns}$ or $NR*2^{p*Ns}$ entries would suffice, i.e. one table for all antenna's or NR tables each for a respective antenna. By using a table that allows for correlated effects, better error correction is made possible.

Measurements of the frequencies at which different antenna signal combinations occur for given symbols may be used to fill the table. Instead of a table, or in combination with the table, a predetermined type of function with a number of adjustable parameters may be used to express the probability. In this case the parameters can be set dependent on measurements of transmission performance. A function expressing the probability of a deviation $Y(i)-AS(i)$ between the ideal demodulated vector $AS(i)$ corresponding to the state $S(i)$ in the absence of noise or distortion and the vector represented by the demodulation result. A Gaussian function may be used for example, which may have a variance as parameter, or a covariance matrix used in the Gaussian function in the case of multidimensional demodulation results $Y(i)$.

Symbol-based decoder 184 may use such predetermined $Pr(Y(i)|S(i))$ values to compute aposteriori probability values for different possible encoded data E given a series of demodulation results [Y]. The symbol-based decoder 184 may then select as demodulation result the possible encoded data with the highest probability subject to the condition that it is permitted by the ECC. From the encoded data the input data can then be retrieved.

Techniques for performing this selection are known per se. Block based ECCs or convolutional ECCs may be used for example. It should be realized that, although probabilities underlie decoding, the computation of probabilities need not be explicit. It may be partly wholly implicit in demodulation, demodulation result being obtained without explicitly computing probabilities.

Optionally, decoding may be performed iteratively, using adaptations of the determination of the demodulation results $Y(i)$ dependent on iterative results of the decoding by symbol based decoder 184. In this case re-interleaving may be used to feed back intermediate decoding results to MIMO detector 180. The embodiment shown in FIG. 1*b* shows this option. The output of the symbol-based decoder 184 is re-interleaved by interleaver 186, and fed back to the MIMO detector 180 for the next iteration. In this embodiment, the computation of the probability may be performed in a number of iterations, in which the probability of received blocks E is updated using the results from symbol based decoder 184. Alternatively, the products of $Pr(Y(i)|S(i))$ values may be used to compute probabilities of syndrome values for the block, may be computed/

In an example of a brute force method for a block based ECC, the product of the $Pr(Y(i)|S(i))$ for the demodulation results $Y(i)$ in the block may be taken to compute indications of probabilities for different strings $((S(0), S(1), \ldots)$ with all combinations of symbol values, which define the states in this case, or with at least sufficiently likely strings, and decoding may involve selecting strings are possible according to the error correcting code and selecting the string among those strings that has the highest product.

In practice, more refined methods than this brute force method may be used. In one embodiment recursive computation of probabilities of syndrome values may be used. As is known per se, an ECC provides for the definition of syndromes (e.g. parities) from received data words. A syndrome is a function of the content of the data word, which can be computed in a series of steps that each produce a respective intermediate syndrome value $Syn(i)$, wherein "i" is an index of the step, as a function $F(Syn(i-1),S(i))$ of the intermediate syndrome value $Syn(i-1)$ of the previous step and data $S(i)$ from the data word from which the syndrome is computed. A result $Syn(N)$ of the final step of this computation is the syndrome for the data word. In the absence of errors the syndrome takes a predetermined value. Reed Solomon codes allow for such a computation of syndromes by using multi-bit arithmetic applied to symbol values for example. When probabilities $Pr(Y(i)|S(i))$ are available, it is possible to perform a recursive computation of the probabilities of different intermediate syndrome values $Syn(i)$. These probabilities follow from the demodulated signals $Y(i)$ and the probabilities of different preceding intermediate syndrome values $Syn(i-1)$.

Using the expressions for such probabilities, for each possible intermediate syndrome value $Syn(i)$ a substring $Sub(Syn(i),i)=\{S(1), S(2) \ldots S(i)\}$ can be selected, the substring containing the most likely series of previous symbol values $S(j)$ with j less than or equal to i that results in the syndrome value $Syn(i)$. This substring $Sub(Syn(i),i)$ is a recursive function of the most likely substrings $Sub(Syn(i-1),i-1)$ for preceding syndrome values $Syn(i-1)$ and the demodulated signal $Y(i)$. Candidates for the most likely substrings in $Sub(Syn(i), i)$ can be determined by expanding the most likely substrings in the previous set $Sub(Syn(i-1),i-1)$ with different possible symbol values $S(i)$ To select the most likely substring from these candidates, the probabilities associated the most likely substrings for respective syndrome values in the previous step may be kept and multiplied by the probabilities $Pr(Y(i)|S(i))$ for the possible added symbols $S(i)$ in the current step. From the result, the most likely expanded substring for a syndrome value $Syn(i)$ can be selected.

This may be repeated in successive steps, each for a successive value of "i" and for all intermediate syndrome values $Syn(i)$ until the most likely substring has been selected that results in the syndrome value $Syn(N)$ of an error free full data word. Then this most likely substring may be used as a decoded code word. Although this technique has been described for a single syndrome computed in successive steps, it should be appreciated that this single syndrome may be composed of a plurality of different syndromes provided for the same data word by the error correcting code. In this case, most likely substrings for values of combinations of the syndromes are selected in successive steps.

Other methods of selecting decoded data words may include first selecting a string $\{S(0), S(1), \ldots S(N)\}$ of most likely symbol values $S(i)$, each based on the individual probability $Pr(Y(i)|S(i))$ and subsequently searching for strings with deviations $S'(i)$ from the most likely symbol values, that satisfy the condition that the deviations result in a string permitted by the ECC and the deviations result in a minimum loss of likelihood. The loss of likelihood of a deviation can be expressed as a function of losses of likelihood $Pr(Y(i)|SW)/Pr(Y(i)|S'(i))$ due to deviations at individual symbols $S(i)$. For different deviations it may be determined whether it results in a codeword from the error correcting code. The deviation with minimum loss in likelihood that has this effect may be a final selection to determined the decoded symbols.

In such a search deviations may be defined by a set of positions of deviating symbols i and deviating values Xi of the symbol at those positions. New deviations can be generated recursively from old deviations by adding a new position and a deviating symbol X value for that new position. Thus, all possible deviations may be generated starting initially from a null deviation without any deviating positions. The probability of the old deviation and optionally also a syndrome value for the old deviation may be used to determine the likelihood of the new deviation and/or whether the new deviation results in membership of the error correcting code.

The testing of the deviations to determine whether they result in a codeword from the ECC may be performed in order of in order of decreasing likelihood of the deviations. In this case, the process may stop a selection of a deviation the first time when a deviation is tested that results in a code word from the error correcting code. But, the deviations may also be tried in a sequence that deviates from the order of decreasing likelihood, if it is ensured that the selection of a deviation that results in a codeword will not be made final until all more likely deviations have been tried. When new deviations are generated by expanding previous deviations, the likelihood of those previous deviations can be used to decide whether there are no more likely deviations left, without generating new deviations. In approximate searches it may suffice that only deviations are tested that are generated according to predetermined rules (e.g. limiting the number of deviating positions), so that a strict requirement of searching all more likely deviations is waived.

Instead of block based encoding, multi-bit symbol based convolutional coding or turbo coding may be used. This type of code uses an ongoing coded stream of symbols, the code providing a way to generate such a coded stream of symbols from an input stream and to distinguish error free coded streams from coded streams with errors. As in the case of a block based code, decoding involves selection of the most likely input stream in view of the demodulation results for the coded stream. For determining the likelihood, symbol based probabilities may be used that account for correlation between different bits in a symbol. For example most likely series of symbols may be determined that result in different running parity (syndrome) values. As another example, a series of most likely symbols may be selected and a search may be made for a most likely succession of deviations from the symbols in that series that results in an error free stream. The likelihood of such successions can be computed from the demodulation results and the symbol based probabilities.

In the case of multi-bit symbol based convolutional coding or turbo coding may be used Pr([Y]|E) can be expressed in terms of probability factors Pr(Y(i)|S(i))*Pr(S(i)|S(i−1)), of demodulation results Y(i) given states S(i) obtained from previous states S(i−1) under the influence data. Computation of the probability may be performed in a number of iterations, in which the probability of received blocks is updated using the results from symbol based decoder 184.

Iterative symbol based decoder 184 may be implemented using a trellis decoding technique, as known from Viterbi decoding. A related technique is described in an article by S. Shin, and P. Sweeney, titled "Soft decision decoding of Reed-Solomon codes using trellis methods", published in IEE Proc. Communications, vol. 14, no. 5, pp. 303-308, October 1994. The trellis is built by tracing the possible sequences of encoder inputs along paths with steps corresponding to multi-bit symbols. For multi-level codes, the reliability information on each branch in the trellis is computed on the symbol or state level, instead of bit level, as for binary codes.

In an iterative approach, probabilities $Pr^{(m)}$ are computed iteratively. The superscript (m) will be used to distinguish probabilities in different iterations. The set S of possible combinations of symbols transmitted in one time slot on all the transmit antennas is denoted as $S = \{S_1, S_2, \ldots\}$. The output of symbol-level decoder 184 corresponds to information representing the probabilities of symbol values at respective positions. An initial condition for the iteration, where m=1, may be taken to be $Pr^{(0)}(\hat{S}=S_l)=\frac{1}{2^k}$. In the $m^{th}$ iteration of MIMO decoder 18, an iterated probability $Pr^{(m)}$ is computed. For the symbol value at a particular position, the probability is a sum of probabilities of trellis paths "c" of successive symbol values that include the symbol value at the particular position:

$$Pr^{(m)}(\hat{S}(i) = S_l) = \sum_{c \in \Gamma(\hat{S}(i) = S_l)} Pr^{(m)}(c), \, i = 1, 2, \ldots, \frac{N}{p}$$

Here the notation of "(i)" is used to distinguish symbols at different positions in the coded data and their reliability information, $\Gamma(\hat{S}(i)=S_l)$ is defined as the set of trellis paths "c" which pass through the state corresponding to $\hat{S}(i)=S_l$ at the ith branch (or ith position in the codeword). $Pr^{(m)}(c)$ is defined as the probability of path c in the mth iteration. Denoting the symbols corresponding to the ith branch of $Pr^{(m)}(c)$ by $S_i^c$, the probability $Pr^{(m)}(c)$ can be expressed as a product of terms corresponding to step along the trellis path $$Pr^{(m)}(c) = \prod_{i=1}^{N/p} Pr^{(m)}_{dec\_input}(\hat{S}(i) = S_i^c)$$

where $$Pr_{dec\_input}^{(m)}(\hat{S}=S_l) \equiv Pr^{(m)}(\hat{S}=S_l|Y) - Pr^{(m-1)}(\hat{S}=S_l)$$

This term depends on the demodulation result Y. In an embodiment MIMO detector 180 may generate information representing $Pr^{(m)}(\hat{S}=S_l|Y)$ according to the following formula:

$$Pr^{(m)}(\hat{S}=S_l|Y) = F(Y-A \cdot S_l) \cdot Pr^{(m-1)}(\hat{S}=S_l) \; (l=1,2,\ldots 2^p)$$

Herein $AS_l$ denotes the ideal demodulated vector corresponding to the symbol $S_l$ in the absence of noise or distortion. The function F( ) expresses the probability that a deviation Y−AS occurs that is needed to change such an ideal modulated vector into the actual demodulated vector. In an embodiment a Gaussian function F( ) may be used, with a variance derived from measurements, or estimated from earlier decoding.

The complexity of the trellis-type decoding increases rapidly with the increase of N, p and it decreases with r, where 0<r<1 is the coding rate. It is preferred to use a high code rate, a relatively small number of antennas (e.g. 2 or 4) and relatively low level modulation (e.g. QPSK, 16QAM). However, in the literature methods have been described to reduce the complexity of symbol-level trellis decoding. This makes it easier to use a larger number of antennas and/or a higher level of modulation, resulting in a larger number of bits per symbol. An example is the method used in U.S. Pat. No. 7,237,180 B1, "Symbol-level soft output Viterbi algorithm (SOVA) and a simplification on SOVA". In such an embodiment only the reliability information of a limited number (e.g. two) most likely candidates are calculated with the help of a simple hard-decision decoder. In the first iterations of MIMO iterative decoding, this simplification will not introduce significant performance loss. While for the last iterations of MIMO iterative decoding, this simplification might involve a tradeoff between complexity and performance. Other simplification methods of bit-level SOVA might be also applicable to symbol level SOVA.

It may be noted that part of the advantage of interleaving in the inner decoder is lost in this way. Because information about groups of bits is kept together the interleaving does not protect against burst errors that occur in a time slot. Instead, use is made of the higher robustness against such errors of multi-bit symbol based codes, such as Reed Solomon codes, which handle the symbols using multi-bit arithmetic (i.e. algebraic) operations. Interleaving is used to reduce the effect of bursts that last for a plurality of time slots.

In an embodiment, a device may be provided wherein the decoder is an iterative decoder coupled to the demodulator and configured to compute indications of probabilities of corrected symbol values in an iteration loop, the decoder comprising a detector and a symbol-based decoder, the detector being configured to compute and output indications of conditional probabilities of corrected symbol values conditioned on received signals from the channel, and computed with the feedback from the symbol-based decoder, the symbol-based decoder being configured to use the de-interleaved output of the detector as input, and to compute and output the indications of symbol level probabilities based on the fact that the stream was encoded using an error correcting code.

In an embodiment a probability modifier unit may be used, coupled between the detector and the de-interleaver, and an interleaver coupled between an output of the decoder and an input of the probability modifier unit, the probability modifier unit being configured to adapt said symbol level indications based on feedback from the decoder after interleaving.

A bit level outer decoder that provides for bit level outer decoding may be used to reduce the effect of such burst errors. In an embodiment a decoder may be added that does not use joint probability information (a convolution decoder, hamming decoder etc.). This decoder may be added behind the p-bit symbol based decoder, outside the iterative loop.

A method is provided to communicate a stream of information transmitted distributed over a plurality of transmission antennas and received distributed over a plurality of reception antennas, the method comprising
- encoding the stream according to an error correcting code, into a series of multi-bit symbols;
- interleaving a sequence of the multi-bit symbols;
- transmitting the interleaved multi-bit symbols each distributed over the transmission antennas in a respective time slot selected according to the interleaved sequence;
- receiving and demodulating signals received at the reception antennas in each respective time slot, producing demodulation results each for a respective time slot;
- de-interleaving a time-slot sequence of the demodulation results;
- selecting symbol values under a constraint that a series of the selected symbols belongs to the error correcting code, the selection being performed based on information about the probability of the symbol values as a function of the demodulation results, wherein the function represents intra time-slot correlation between effects of the signals from combinations of the reception antennas upon the probability.

The invention claimed is:

1. A method of communicating a stream of information transmitted distributed over a plurality of transmission antennas and received distributed over a plurality of reception antennas, the method comprising:
- encoding the stream according to an error correcting code, into a series of multi-bit symbols of the error correcting code;
- interleaving a sequence of the multi-bit symbols of the error correcting code, rearranging the sequence of the multi-bit symbols of the error correcting code while keeping bits within each multi-bit symbol of the error correcting code together;
- transmitting the multi-bit symbols from the interleaved sequence of the multi-bit symbols of the error correcting code, each distributed over the transmission antennas in a respective time slot selected according to the interleaved sequence of the multi-bit symbols of the error correcting code;
- receiving and demodulating signals received at the reception antennas in each respective time slot, producing demodulation results each for a respective time slot;
- de-interleaving a time-slot sequence of the demodulation results inversely with respect to said interleaving;
- defining a function that, when applied to the demodulation results, results in information about the probabilities of the multi-bit symbols values of the error correcting code based on the demodulation results, the information accounting for intra time-slot correlation between effects of the signals from combinations of the reception antennas; and
- selecting symbol values under a constraint that a series of the selected symbol values belongs to the error correcting code, the selection being performed based on the information about the probability of the symbol values according to application of the function to the demodulation results, by selecting strings of symbol values that are possible according to the error correcting code, computing, for each of the strings, a product of conditional probability functions $Pr(Y(i)|S(i))$ of the demodulation results $Y(i)$ in respective ones of the time-slots given a corresponding symbol value $S(i)$ in the string, and selecting one of the strings that has the highest product among the strings.

2. The method according to claim 1, wherein use is made of a stored table with entries with information about the probability, to represent the function, the table including entries for demodulation results for different combinations of signals from the reception antennas, the entries for demodulation results for different combinations of signals the probability values representing correlations between the effects of different ones of the antennas.

3. The method according to claim 1, wherein the function has a predetermined function type with adjustable parameters, the parameters being stored to enable computation of function values for said selection of symbol values.

4. The method according to claim 1, wherein the error correcting code is a multi-bit symbol arithmetic based code, wherein
- the encoding step comprises applying the multi-bit symbol arithmetic to input bits taken from the stream to produce the multi-bit symbols of the encoded stream; and
- the interleaving step comprises assigning multi-bit symbols from the encoded stream to respective ones of the time-slots in a time slot sequence, changing distances between the symbols in the time slot sequence compared to distances between the symbols in the encoded stream.

5. The method according to claim 1, comprising computing indications of probabilities of corrected symbol values in an iteration loop, which comprises iteration of the steps of:
- computing and outputting indications of conditional probabilities of corrected symbol values conditioned on the received signals from the reception antennas, with feedback from a symbol-based decoder; and
- using the de-interleaved output as the input for the symbol-based decoder, and computing and output the indications of the symbol level probabilities determined dependent on the error correcting code.

6. The method according to claim 1, wherein the selection of symbol values comprises searching for strings of symbol values that are compatible with the error correcting code, computing indications of probability values of the strings dependent on the demodulation results and correlated probabilities of the demodulation results per time slot, given individual symbol values in the strings, and selecting a final string from the search that maximizes the indicated probability value.

7. The method according to claim 1, wherein the selection of symbol values comprises selecting an initial string of most likely symbol values, each symbol value in the initial string being based on the individual probability Pr(Y(i)|S(i)) given corresponding modulation result Y(i), and subsequently searching for strings with deviations S' (i) from the most likely symbol values, that satisfy the condition that the deviations result in a string permitted by the ECC and the deviations result in a minimum loss of probability, expressed as a function of losses of probability due to deviations at individual symbols S(i).

8. A device for receiving stream of information that has been distributed over a plurality of transmission antennas and a plurality of reception antennas, the device comprising:
   a plurality of inputs, for receiving signals derived from respective ones of the antennas,
   a demodulator coupled to the plurality of inputs and configured to produce successive indications of symbol level probabilities for respective time slots, the symbol level probabilities indicating that respective different possible multi-bit symbol values have been transmitted in the respective time slot, the indications representing correlation between bits in the multi-bit symbol;
   a de-interleaver coupled to an output of the demodulator and configured to assign the indications of symbol level probabilities for the respective time slots to multi-bit symbol positions in an error correcting code, changing distances between the symbols in a time slot sequence compared to distances between the symbols in the code and keeping the multiple bits in the symbol together; and
   a decoder coupled to an output of the de-interleaver and configured to select symbol values under a constraint that a series of the selected symbols belongs to the error correcting code, the selection being performed based on information about the probability of the symbol values, the information being defined by application of a function to the demodulation results, using a function that accounts for intra time-slot correlation between effects of the signals from combinations of the reception antennas, by selecting strings of symbol values that are possible according to the error correcting code, computing, for each of the strings, a product of conditional probability functions Pr(Y(i)|S(i)) of the demodulation results Y(i) in respective ones of the time-slots given a corresponding symbol value S(i) in the string and selecting one of the strings that has the highest product among the strings.

9. The device according to claim 8, comprising a memory wherein a table is stored, with entries with information about the probability, to represent the function, the table including entries for demodulation results for different combinations of signals from the reception antennas, the entries for demodulation results for different combinations of signals the probability values representing correlations between the effects of different ones of the antennas.

10. The device according to claim 8, comprising an arithmetic circuit configured to compute values of symbol probabilities using said function, computed using a predetermined function type with adjustable parameters, and a memory for values of the parameters for use in the function computation, which values of the parameters determine the correlations.

11. The device according to claim 8, comprising a bit based decoding unit coupled to an output of the decoder.

12. The device according to claim 8, wherein the error correcting code is a Reed Solomon code.

13. The device according to claim 8, wherein the decoder is configured to select of symbol values by selecting an initial string of most likely symbol values, each symbol value in the initial string being based on the individual probability Pr(Y(i)|S(i)) given corresponding modulation result Y(i), and subsequently searching for strings with deviations S'(i) from the most likely symbol values, that satisfy the condition that the deviations result in a string permitted by the ECC and the deviations result in a minimum loss of probability, expressed as a function of losses of probability due to deviations at individual symbols S(i).

14. A device for transmitting a stream of information distributed over a plurality of transmission antennas, the device comprising:
   an encoder with an input for receiving the stream of information, the encoder configured to convert bits taken from the stream to multi-bit symbols of an error correcting code in an encoded stream;
   an interleaver with an input coupled to an output of the encoder and configured to assign the multi-bit symbols of the error correcting code from the encoded stream to respective time-slots in a time slot sequence, thereby changing distances between the symbols of the error correcting code in the time slot sequence compared to distances between the multi-bit symbols of the error correcting code in the encoded stream and keeping the multiple bits in the multi-bit symbol of the error correcting code together; and
   a modulator arrangement with an input coupled to the interleaver and a plurality of outputs for feeding modulated signals to respective transmission antennas, the modulator configured to generate modulated signals for transmission by the transmission antennas in the respective time slots on which the multi-bits symbols of the error correcting code assigned to the respective time slots are modulated.

15. The device according to claim 11, wherein the error correcting code is a Reed Solomon code.

16. A method of communicating a stream of information transmitted distributed over a plurality of transmission antennas and received distributed over a plurality of reception antennas, the method comprising:
   encoding the stream according to an error correcting code, into a series of multi-bit symbols of the error correcting code;
   interleaving a sequence of the multi-bit symbols of the error correcting code, rearranging the sequence of the multi-bit symbols of the error correcting code while keeping the bits within each multi-bit symbols of the error correcting code together;
   transmitting the multi-bit symbols from the interleaved sequence of the multi-bit symbols of the error correcting code, each distributed over the transmission antennas in a respective time slot selected according to the interleaved sequence of the multi-bit symbols of the error correcting code;
   receiving and demodulating signals received at the reception antennas in each respective time slot, producing demodulation results each for a respective time slot;
   de-interleaving a time-slot sequence of the demodulation results inversely with respect to said interleaving;
   using a table comprising entries that each contain a probability value for a combination of modulation signal values for the different reception antenna's and a symbol value, the probability values representing correlations between the effects of different antenna's, to provide information about the probabilities of the multi-bit symbols values of the error correcting code based on the demodulation results, the information accounting for intra time-slot correlation between effects of the signals from combinations of the reception antennas; and selecting symbol values under a constraint that a series of the selected symbols values belongs to the error correcting code, the selection being performed based on the information about the probability of the symbol values according to application of the function to the demodulation results.

17. A method of communicating a stream of information transmitted distributed over a plurality of transmission antennas and received distributed over a plurality of reception antennas, the method comprising:

encoding the stream according to an error correcting code, into a series of multi-bit symbols of the error correcting code;

interleaving a sequence of the multi-bit symbols of the error correcting code, rearranging the sequence of the multi-bit symbols of the error correcting code while keeping the bits within each multi-bit symbols of the error correcting code together;

transmitting the multi-bit symbols from the interleaved sequence of the multi-bit symbols of the error correcting code, each distributed over the transmission antennas in a respective time slot selected according to the interleaved sequence of the multi-bit symbols of the error correcting code;

receiving and demodulating signals received at the reception antennas in each respective time slot, producing demodulation results each for a respective time slot;

de-interleaving a time-slot sequence of the demodulation results inversely with respect to said interleaving;

using a table comprising entries that each contain a probability value for a combination of modulation signal values for the different reception antenna's and a symbol value, the probability values representing correlations between the effects of different ones of the antennas, to provide information about the probabilities of the multi-bit symbols values of the error correcting code based on the demodulation results, the information accounting for intra time-slot correlation between effects of the signals from combinations of the reception antennas; and selecting symbol values under a constraint that a series of the selected symbols values belongs to the error correcting code, the selection being performed based on the information about the probability of the symbol values according to application of the function to the demodulation results.

18. A device for receiving stream of information that has been distributed over a plurality of transmission antennas and a plurality of reception antennas, the device comprising:

a plurality of inputs, for receiving signals derived from respective ones of the antennas, a demodulator coupled to the plurality of inputs and configured to produce successive indications of symbol level probabilities for respective time slots, the symbol level probabilities indicating that respective different possible multi-bit symbol values have been transmitted in the respective time slot, the indications representing correlation between bits in the multi-bit symbol;

a de-interleaver coupled to an output of the demodulator and configured to assign the indications of symbol level probabilities for the respective time slots to multi-bit symbol positions in an error correcting code, changing distances between the symbols in the a time slot sequence compared to distances between the symbols in the code and keeping the multiple bits in the symbol together; and a decoder coupled to an output of the de-interleaver and configured to select symbol values under a constraint that a series of the selected symbols belongs to the error correcting code, the selection being performed based on information about the probability of the symbol values, the information being defined by application of a function to the demodulation results, the function being defined using a table that comprises entries that each contain a probability value for a combination of modulation signal values for the different reception antenna's and a symbol value, the probability values representing correlations between the effects of different ones of the antennas.

* * * * *